Oct. 25, 1927.

J. L. BURNS 1,646,897

COUNTERBALANCING DEVICE FOR SHAFTS

Filed Nov. 23, 1925

INVENTOR.

John L. Burns

BY

Parsons & Bodell

ATTORNEYS

Oct. 25, 1927. 1,646,897
J. L. BURNS
COUNTERBALANCING DEVICE FOR SHAFTS
Filed Nov. 23, 1925 2 Sheets-Sheet 2
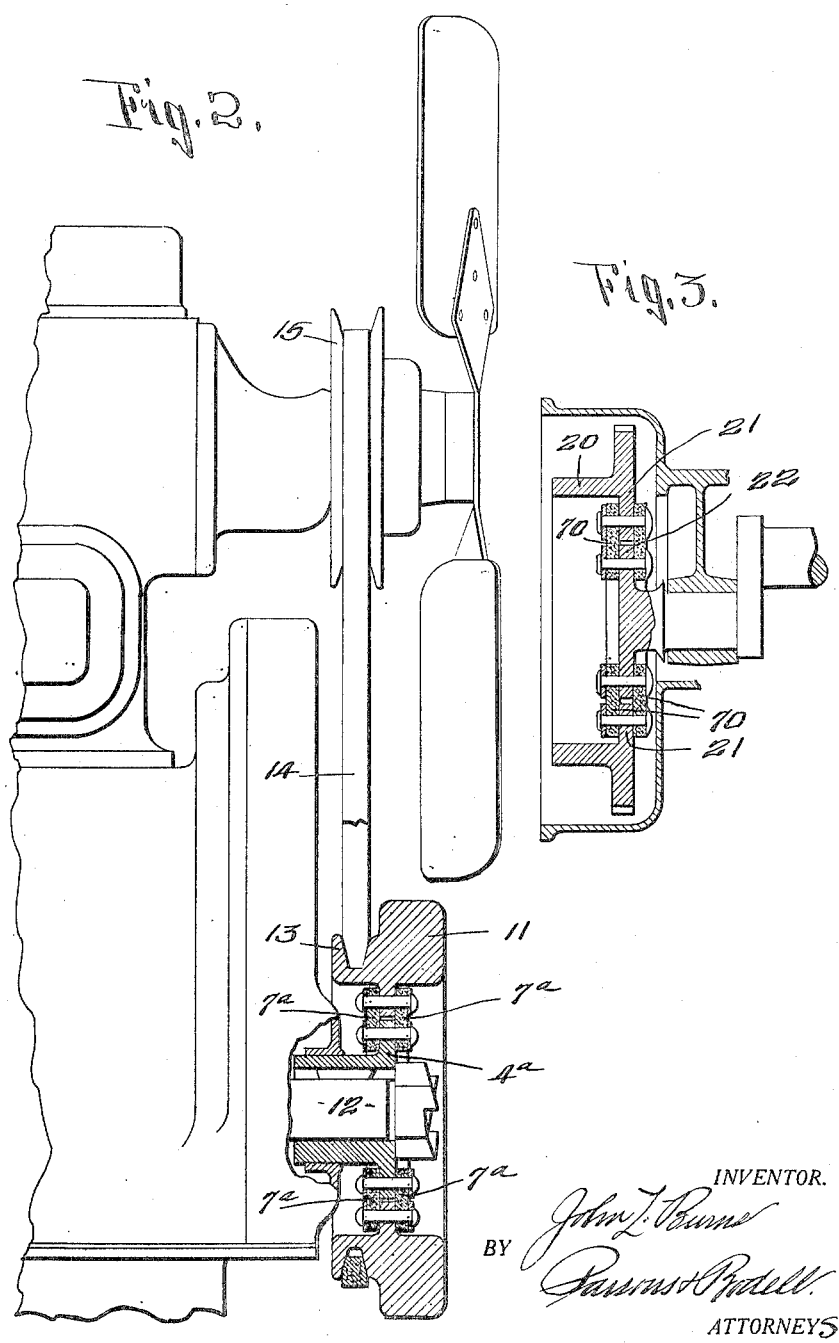

Patented Oct. 25, 1927.

1,646,897

UNITED STATES PATENT OFFICE.

JOHN L. BURNS, OF SYRACUSE, NEW YORK, ASSIGNOR TO H. H. FRANKLIN MANUFACTURING COMPANY, OF SYRACUSE, NEW YORK, A CORPORATION OF NEW YORK.

COUNTERBALANCING DEVICE FOR SHAFTS.

Application filed November 23, 1925. Serial No. 70,764.

This invention relates to counterbalancing means for rotating shafts, particularly the crank shafts of internal combustion engines which are subject to vibrations due to the explosions in the cylinders and has for its object a particularly simple and efficient means for neutralizing or absorbing the vibrations of the crank shaft.

The invention consists in the novel features and in the combinations and constructions hereinafter set forth and claimed.

In describing this invention, reference is made to the accompanying drawings.

Figure 2 is a fragmentary elevation of an engine provided with a fly wheel at its front end.

Figure 3 is a detail view of a crank shaft having the ordinary fly wheel, provided with my invention.

Figure 1:
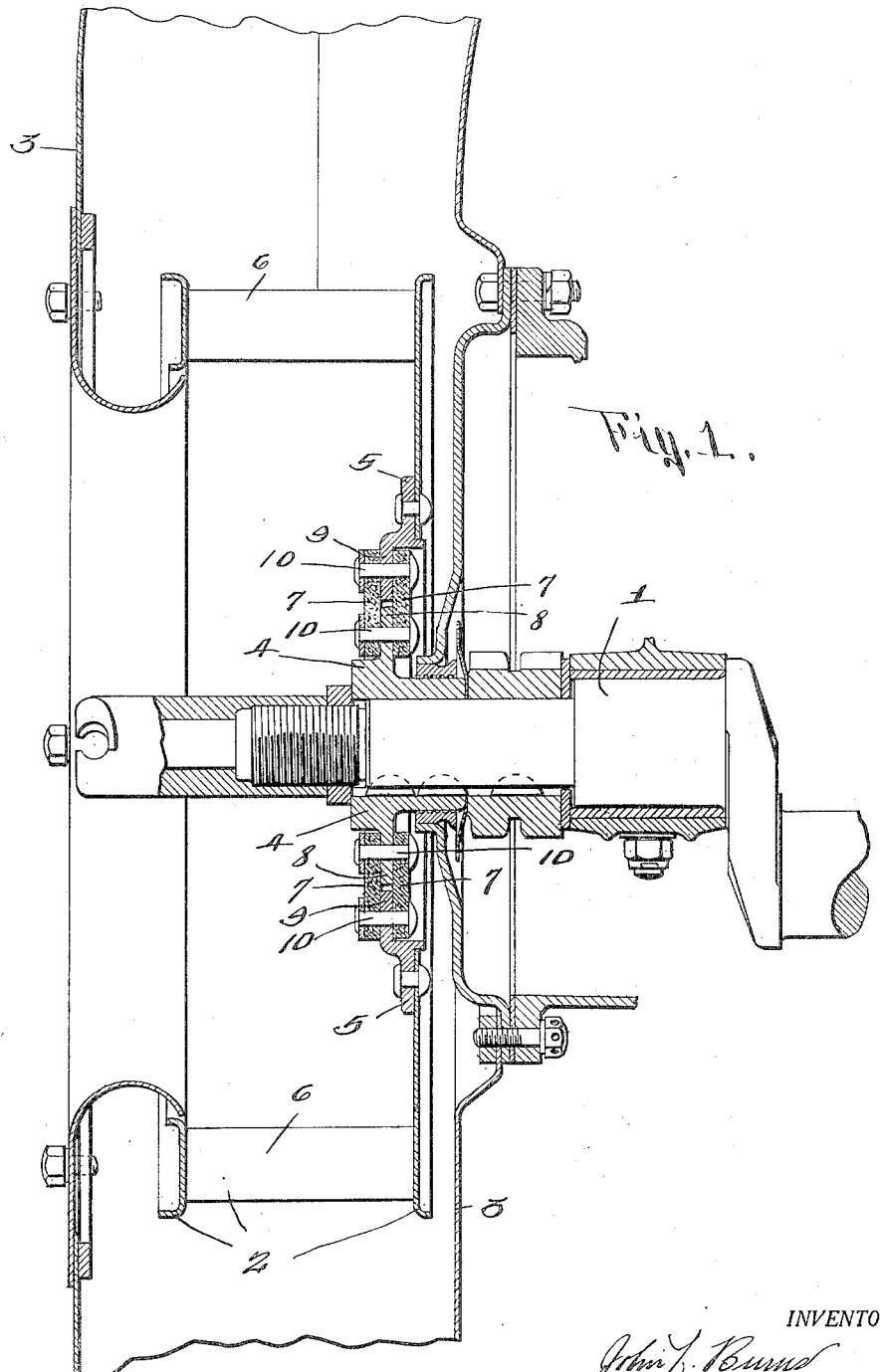
Figure 1 is a fragmentary vertical sectional view of a crank shaft provided with one form of my invention.

This vibration or shock absorbing means for shafts, as crank shafts, comprises a centrifugal element mounted on the shaft and rotatable therewith and including an inner member or hub, an outer annular member and an intermediate member connecting the former members and formed of a vibration absorbing material as a fibrous, non-rigid, if not flexible, material.

In Figure 1, the centrifugal element is shown as the fan on the front end of the crank shaft on a Franklin air cooled engine. 1 designates the crank shaft which is mounted in any suitable manner in the crank case.

2 is the centrifugal element or fan located in the fan casing 3. The element 2 comprises an inner member or hub 4 mounted on the front end of the crank shaft 1 to rotate therewith, an outer annular rim portion or member 5 which carries the blades 6 of the fan and an intermediate element 7 connecting the inner and outer elements 4 and 5.

The element 7 is shown as consisting of two annular disks of a fibrous compound which is not rigid, if not very flexible, the disks being arranged on the front and rear sides of the annular flanges 8 and 9 on the hub 4 and outer member 5 and being secured thereto by fastening members 10 extending transversely through said disks and said flanges, the fastening members being usually rivets. The disks, to some extent not only absorb the shocks and vibrations from the crank shaft and keep them from being transferred to the centrifugal member as the fan or fly wheel, but also to some extent neutralize the vibration by permitting the centrifugal member to tend to assume its own axis of rotation, within limits.

In Figure 2, the centrifugal member is shown as a fly wheel 11 mounted on the front end of the crank shaft 12 and provided with a pulley 13 for a belt 14 which drives the fan pulley 15 of a water cooled engine.

In this construction shown in Figure 2, 7ª designates the annular disks of vibrating absorbing material which connect the inner member or hub 4ª with the outer member or rim of the fly wheel.

In Figure 3, an ordinary fly wheel 20 is shown, the rim 21 of which is connected to the hub 22 by flexible disks or washers 70.

What I claim is:

A counterbalancing device for rotating shafts comprising a centrifugal element including a hub mounted on the shaft and having an annular flange, an annular outer member and an intermediate member, the outer member having an internal annular flange and the edges of said annular flanges being opposed to and located close to each other, the intermediate member being of a fibrous vibration absorbing material and lapping said flanges and being secured thereto.

In testimony whereof, I have hereunto signed my name, at Syracuse, in the county of Onondaga, and State of New York, this 28th day of October, 1925.

JOHN L. BURNS.